United States Patent [19]

Suzuki

[11] Patent Number: 5,477,297
[45] Date of Patent: Dec. 19, 1995

[54] ZOOM LENS SYSTEM WITH VIBRATION REDUCING FUNCTION

[75] Inventor: Kenzaburo Suzuki, Tokyo, Japan

[73] Assignee: Nikon Corporation, Tokyo, Japan

[21] Appl. No.: 309,746

[22] Filed: Sep. 21, 1994

[30] Foreign Application Priority Data

Sep. 22, 1993 [JP] Japan ................................ 5-259375

[51] Int. Cl.$^6$ ........................................................ G03B 1/18
[52] U.S. Cl. .................................. 354/195.1; 354/195.12
[58] Field of Search ............................. 354/195.1, 195.12

[56] References Cited

U.S. PATENT DOCUMENTS 5,337,098  8/1994  Imafuji et al. .
5,402,197  3/1995  Okano et al. .
5,416,558  5/1995  Katayama et al. .

FOREIGN PATENT DOCUMENTS 1-191113  8/1989  Japan .

*Primary Examiner*—Monroe H. Hayes
*Attorney, Agent, or Firm*—Shapiro and Shapiro

[57] ABSTRACT

A zoom lens system with a vibration reducing function comprises, in the following order from the object side, a first lens group with a positive refractive power, a second lens group with a negative refractive power, a third lens group with a positive refractive power, and a fourth lens group with a positive refractive power. The fourth lens group has a front group with a positive refractive power and a rear group with a positive refractive power. When changing a focal length of the zoom lens system from a wide-angle end to a telephoto end, the distance between the first lens group and the second lens group is increased, and the distance between the second lens group and the third lens group and the distance between the third lens group and the fourth lens group are changed nonlinearly. The front group of the fourth lens group is shiftable in a direction traversing the optical axis of the zoom lens system. The zoom lens system further comprises a drive device for shifting the front group in the direction traversing the optical axis, a detecting device for detecting vibration of the zoom lens system, and a controller for controlling the drive device based on an output from said detecting means.

20 Claims, 9 Drawing Sheets

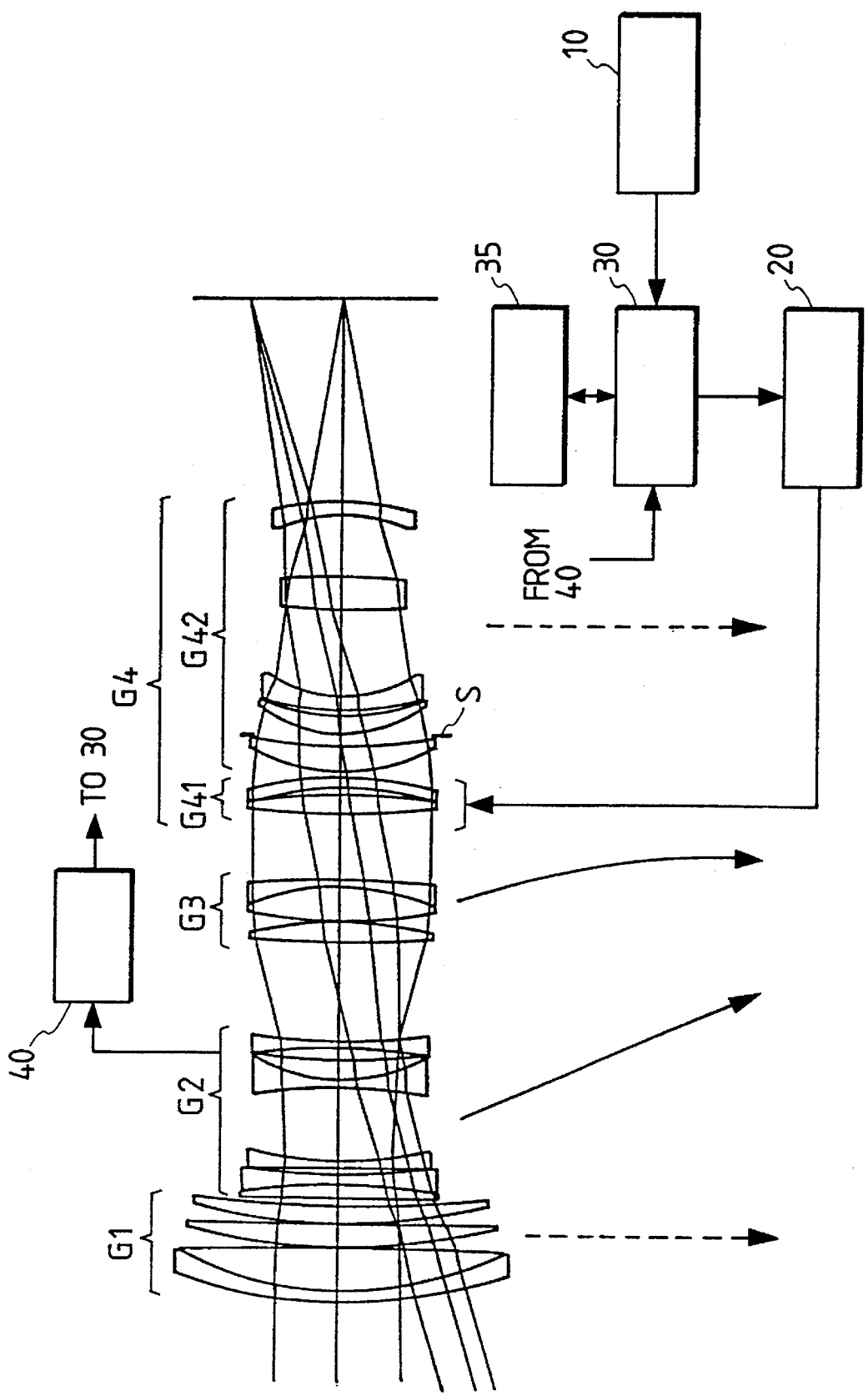

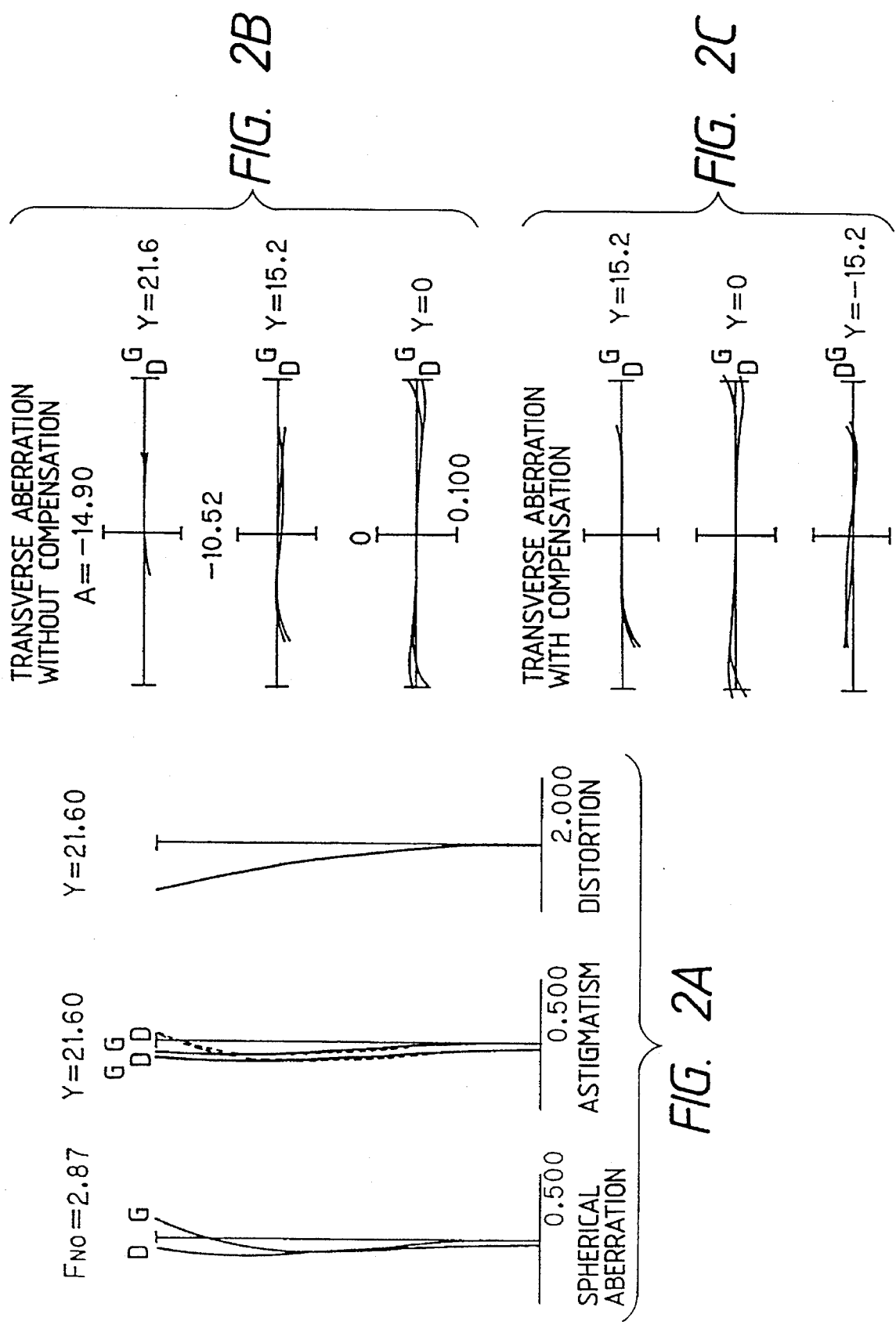

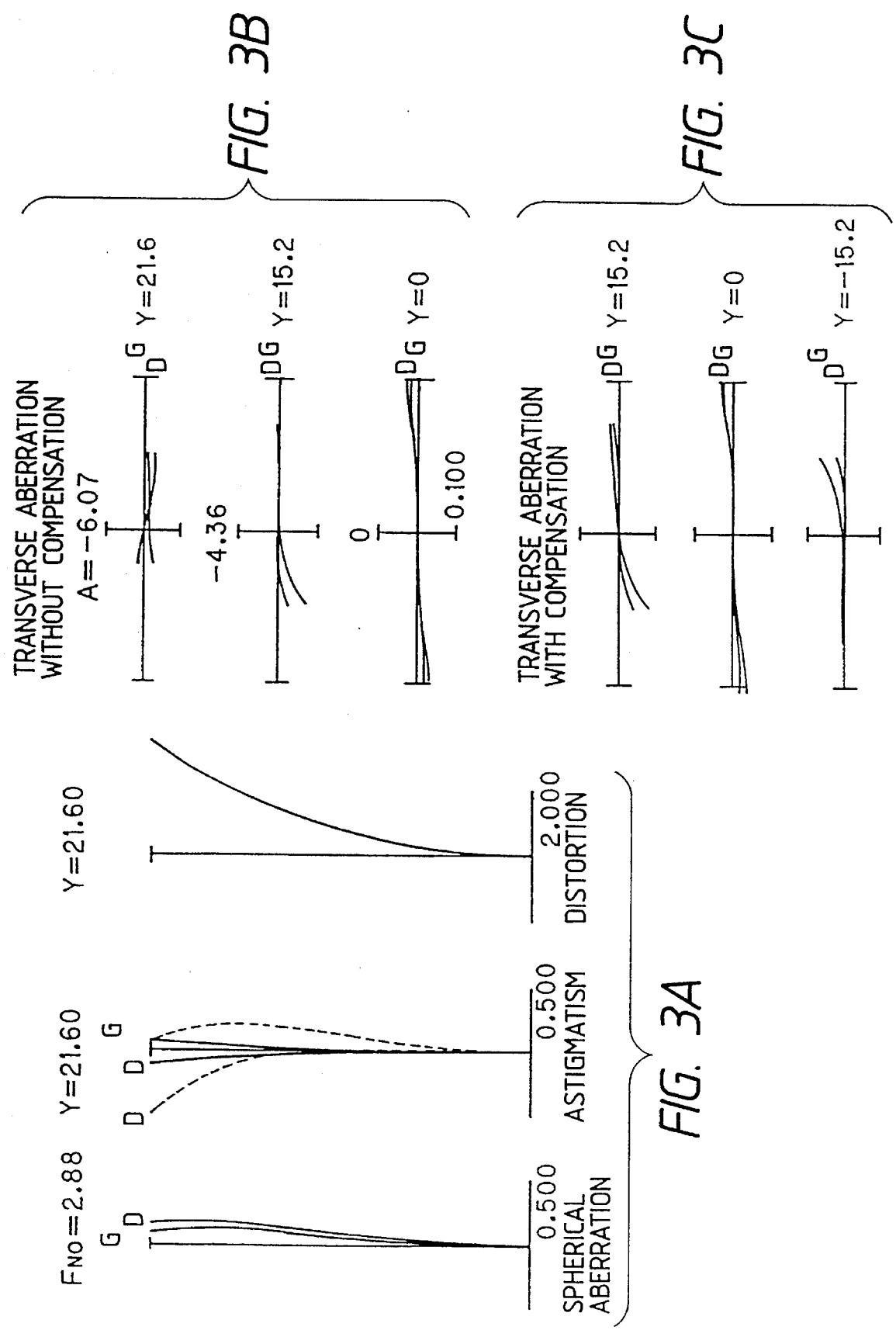

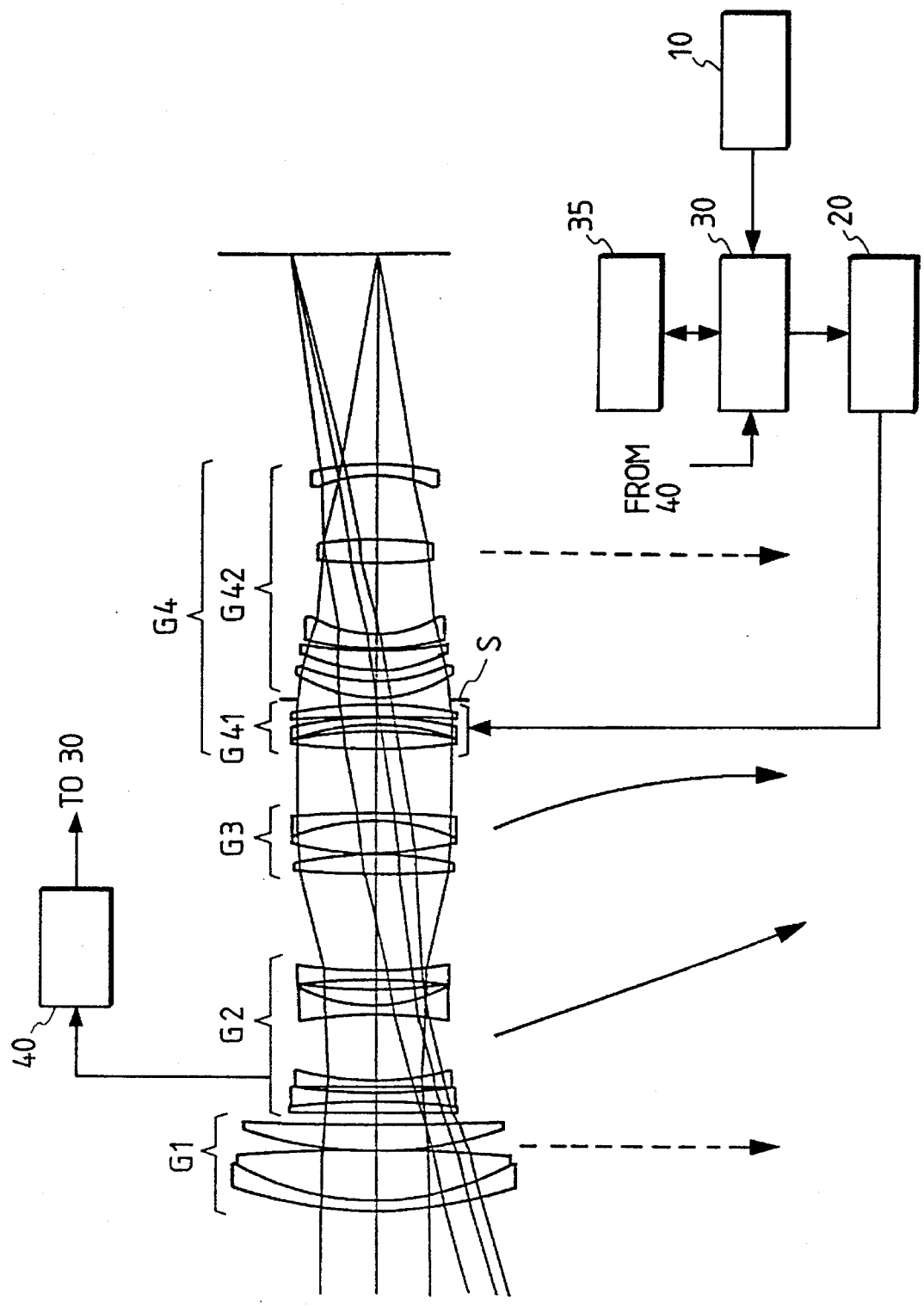

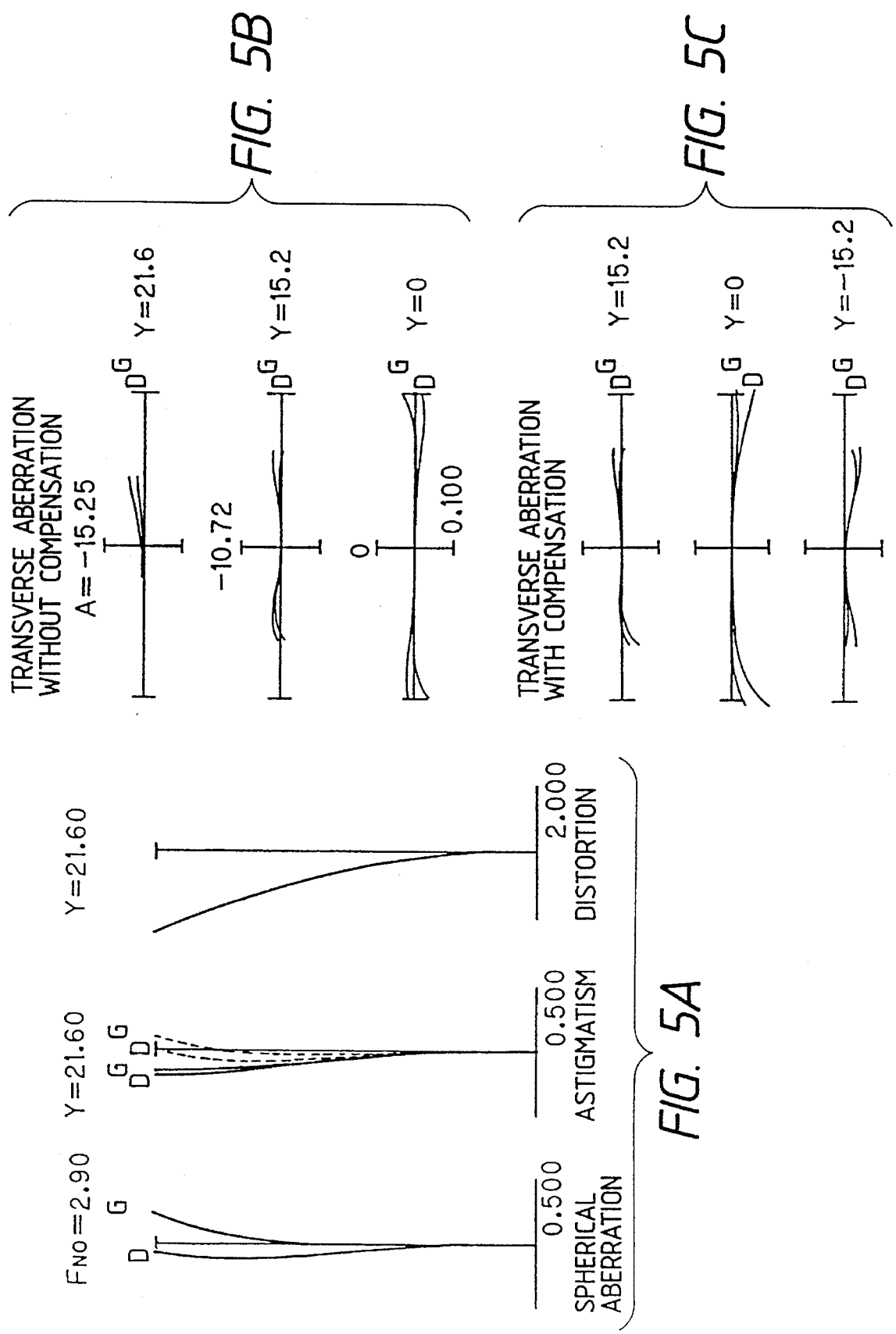

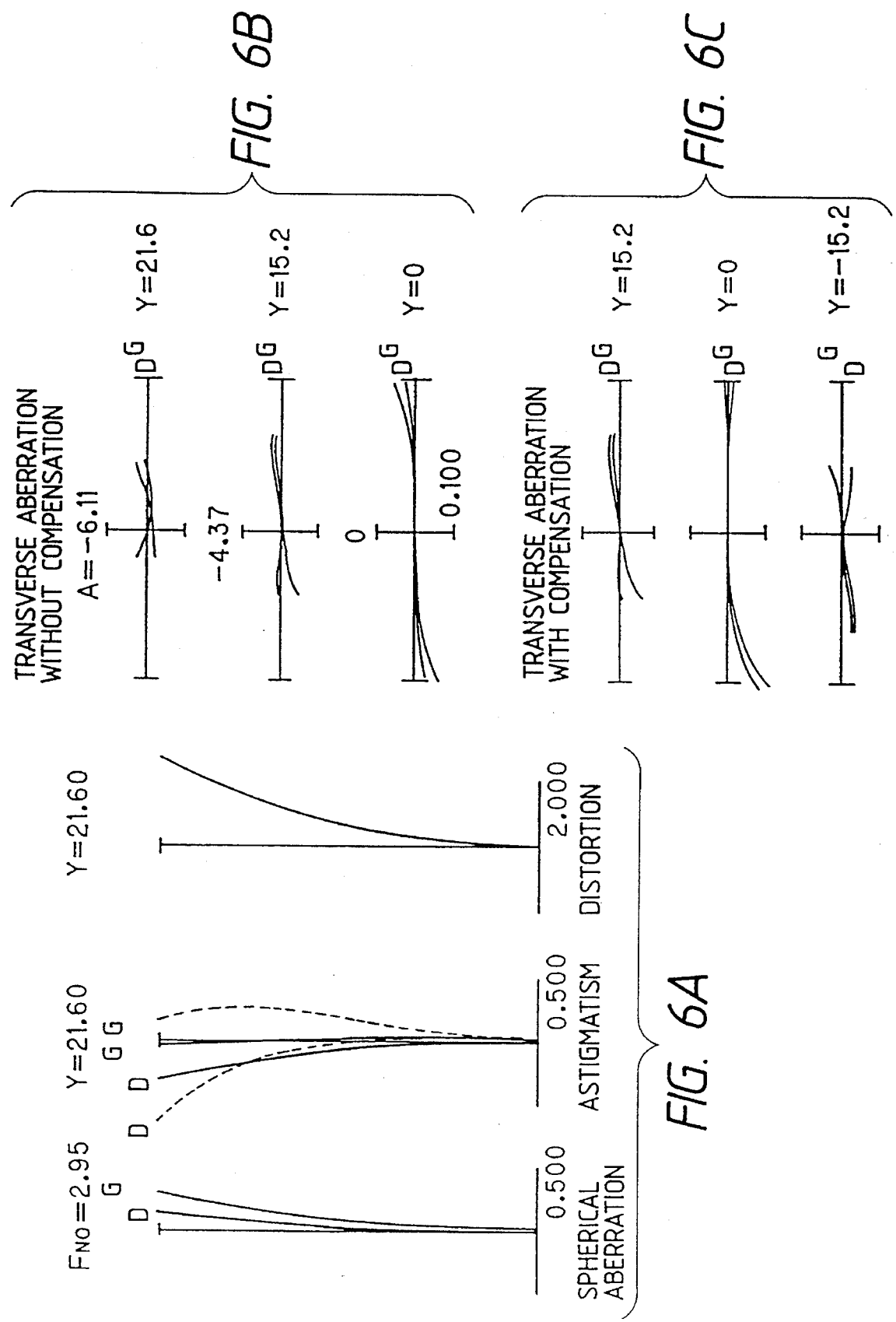

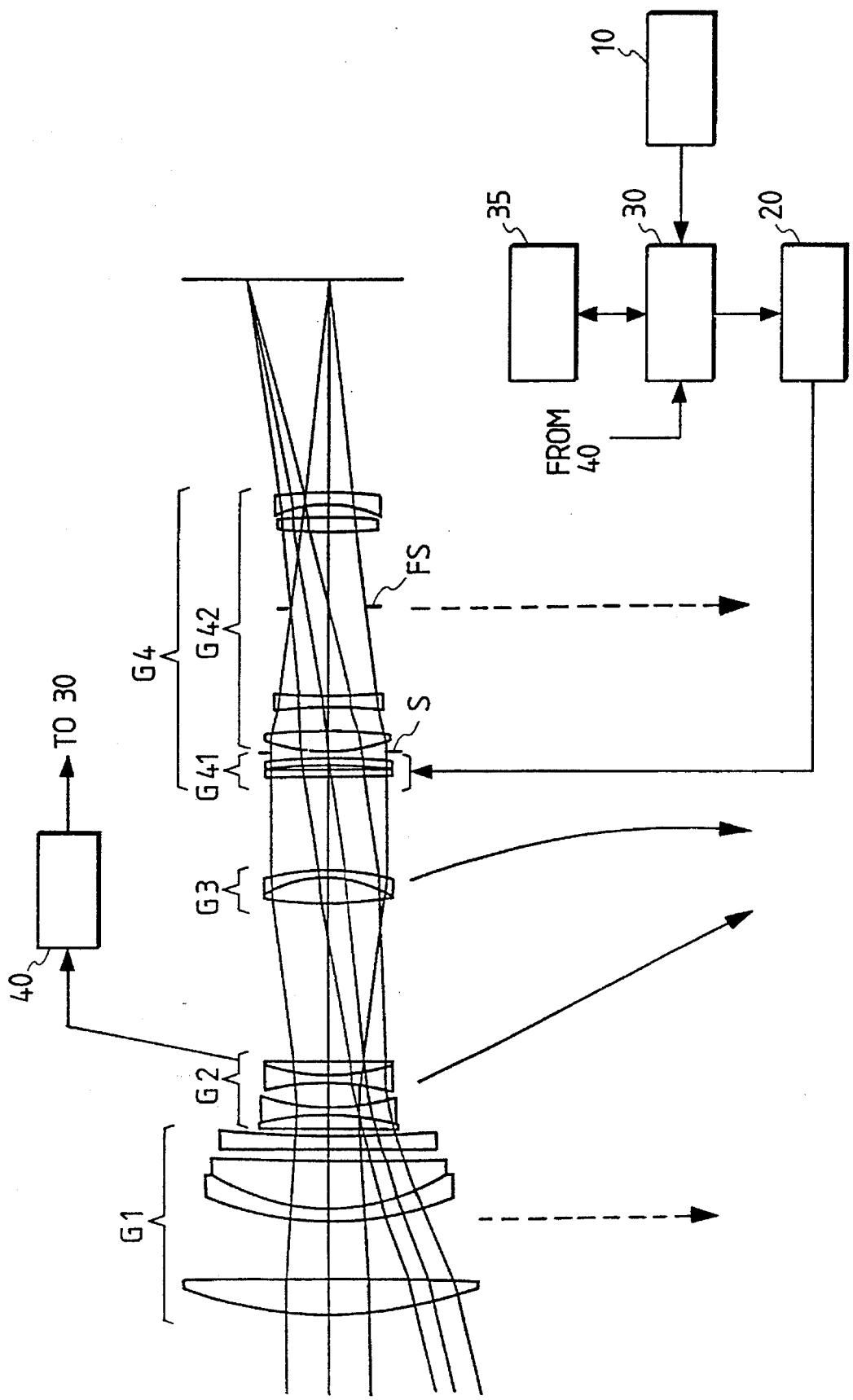

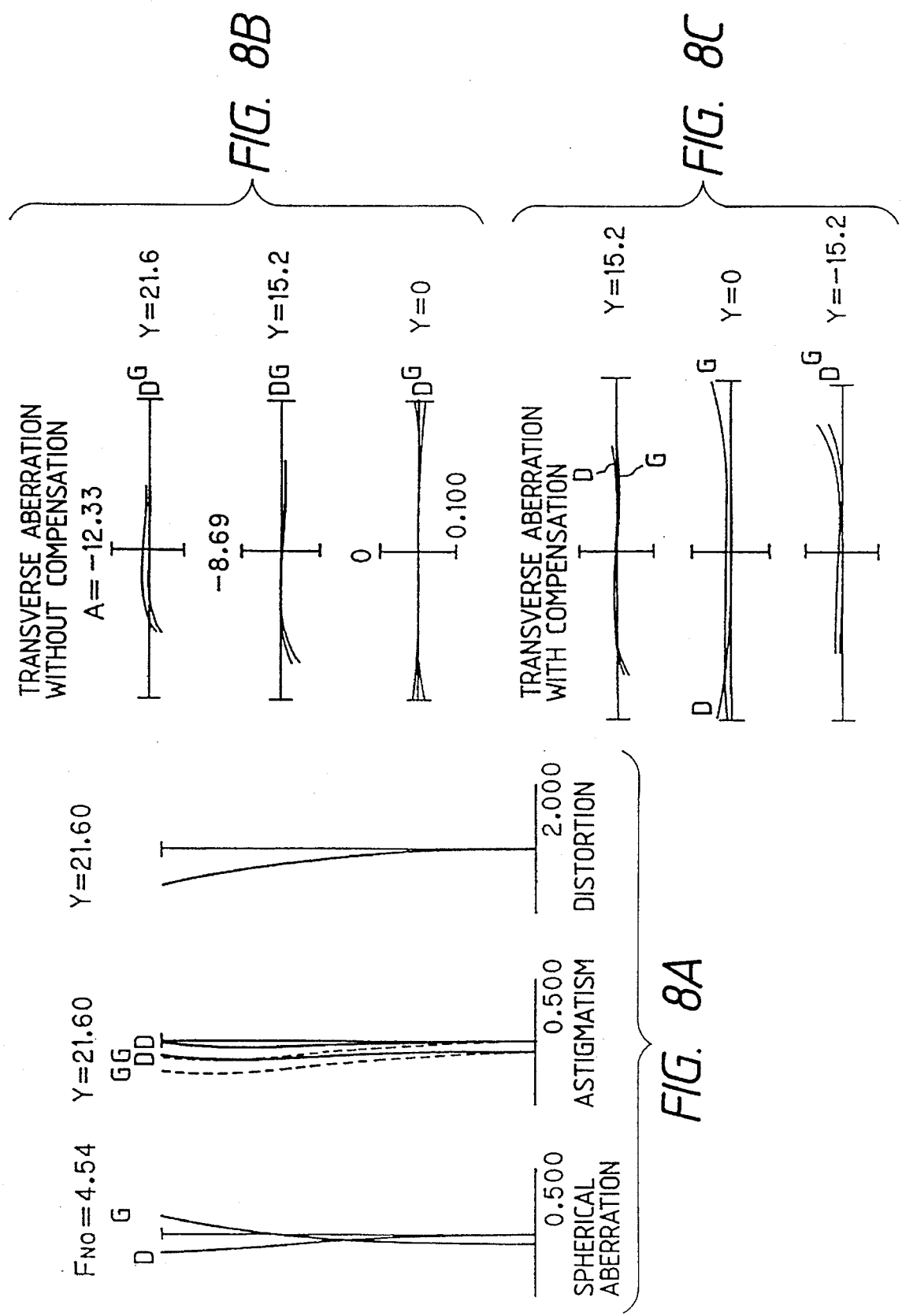

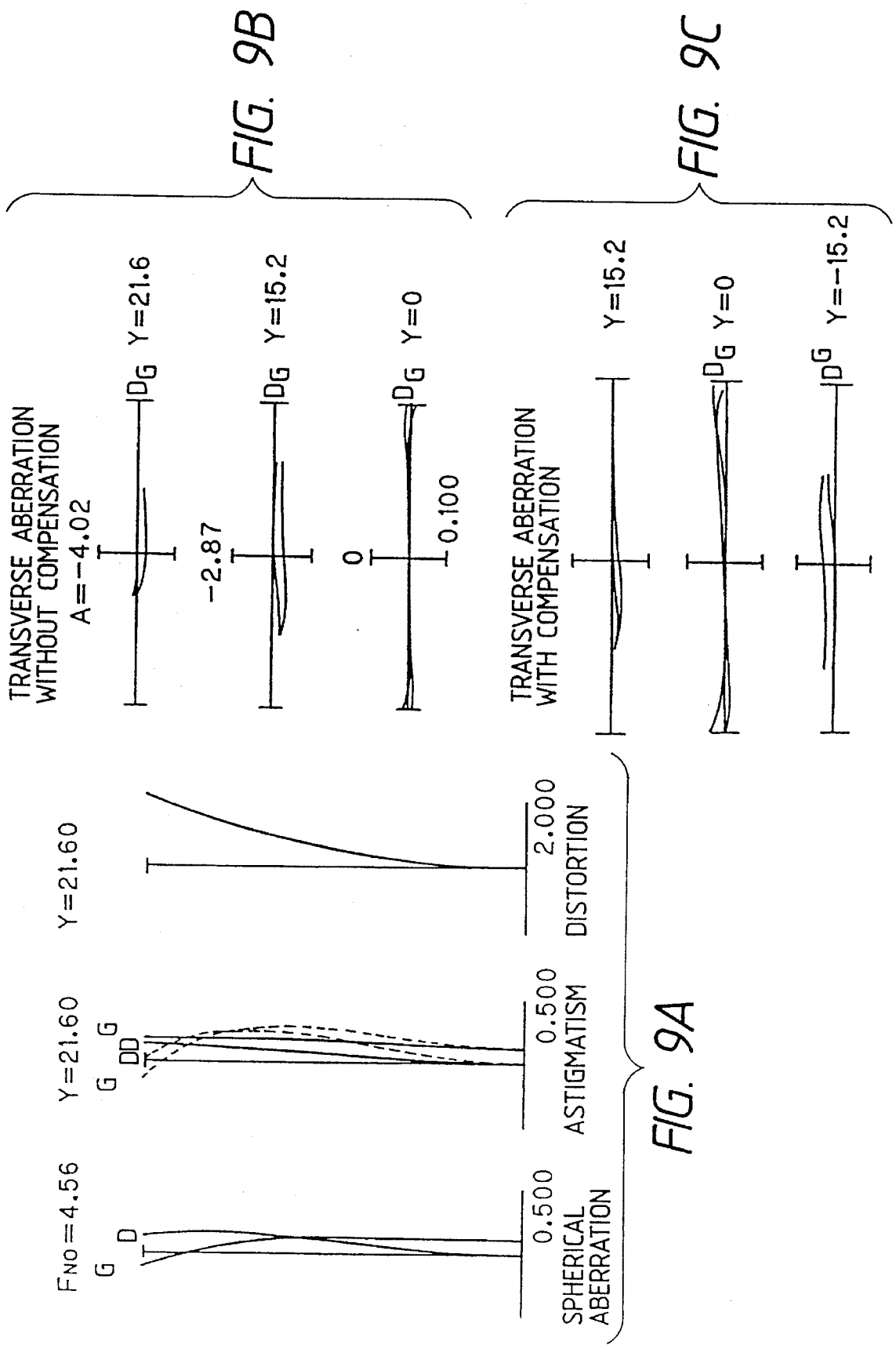

ZOOM LENS SYSTEM WITH VIBRATION REDUCING FUNCTION

BACKGROUND OF THE INVENTION

1. Field of the Invention

The present invention relates to a zoom lens with a vibration reducing function and more particularly to a vibration reducing method of a photographic lens, a zoom lens for a video camera, etc.

2. Related Background Art

There is a known zoom lens with a vibration reducing function as disclosed in, e.g., Japanese Patent Laid-Open Application No. 1-191113. The zoom lens in Japanese Patent Laid-Open Application No. 1-191113, is formed of two or more lens groups and the whole or a portion of the lens group moved in a zooming operation is shifted in a direction perpendicular to the optical axis to correct a change of an image position due to movement of hands or the like.

In the present invention, to correct the change of the image position due to the movement of the hands or the like by shifting the lens group in the direction perpendicular to the optical axis is called "vibration reduction".

However, in the above prior art, the vibration reducing lens group (the lens group shifted in the direction perpendicular to the optical axis for vibration reduction) is moved along the optical axis in the zooming operation. Therefore, a mechanism for holding the vibration reducing lens group becomes complicated. Further, in the lens system disclosed in Japanese Patent Laid-Open Application No. 1-191113, F-number is about 3.5 to 5.6 and that is, the lens system is dark. Also, a sufficient back focus for a single-lens reflex camera cannot be obtained.

SUMMARY OF THE INVENTION

It is an object of the present invention to provide a high performance zoom lens with a vibration reducing function which is applicable to a single-lens reflex camera, has a simple mechanism and a small F-number and is suitable for a photographic camera, a video camera, etc.

In order to achieve the above object, a zoom lens system with a vibration reducing function according to an embodiment of the present invention has, in the following order from the object side, a first lens group with a positive refractive power, a second lens group with a negative refractive power, a third lens group with a positive refractive power and a fourth lens group with a positive refractive power. The fourth lens group has a front group with a positive refractive power and a rear group with a positive refractive power. When changing the focal length of the zoom lens system from a wide-angle end to a telephoto end, the distance between the first lens group and the second lens group is increased, and the distance between the second lens group and the third lens group and the distance between the third lens group and the fourth lens group are changed nonlinearly. The front group of the fourth lens group is shiftable along a direction traversing an optical axis. The zoom lens system further has driving means for shifting said front group along the direction traversing the optical axis, detecting means for detecting vibration of the zoom lens system and control means for controlling the driving means in accordance with an output from the detecting means.

In order to achieve the above object, a zoom lens system with a vibration reducing function according to another embodiment of the present invention has, in the following order from the object side, a first lens group with a positive refractive power, a second lens group with a negative refractive power, a third lens group with a positive refractive power and a fourth lens group with a positive refractive power. The fourth lens group has a front group with a positive refractive power and a rear group with a positive refractive power. When changing the focal length of the zoom lens system from a wide-angle end to a telescopic end, the distance between the first lens group and the second lens group is increased, and the distance between the second lens group and the third lens group and the distance between the third lens group and the fourth lens group are changed nonlinearly. The front group of the fourth lens group is shiftable along a direction traversing an optical axis.

The zoom lens of the present invention has, suitably for a photographic camera or a video camera, in the following order from the object side, the first lens group G1 with the positive refractive power, the second lens group G2 with the negative refractive power, the third lens group G3 with the positive refractive power and the fourth lens group G4 with the positive refractive power. The fourth lens group G4 has the front group G41 with the positive refractive power and the rear group G42 with the positive refractive power. When changing the focal length of the zoom lens system from the wide angle end to the telephoto end, the distance between the first lens group G1 and the second lens group G2 is increased, and the distance between the second lens group G2 and the third lens group G3 and the distance between the third lens group G3 and the fourth lens group G4 are changed nonlinearly.

In this type of zoom lens, there are characteristics or advantages that it is possible to achieve the zoom lens having a bright F-number and favorable imaging performance can be obtained in each focal length. For example, it is known a zoom lens with an F-number of about 2.8 to which the above structure is applied. The zoom lens with the above structure is widely used as a zoom lens for a photographic camera or a video camera because of the excellent characteristics.

The present invention concerns this type of zoom lens and found optimum conditions when performing vibration reduction by shifting the front group G41 of the fourth lens group G4 in a direction approximately perpendicular to the optical axis.

Hereinafter, such optimum conditions will be described.

Generally, in a zoom lens in which a positive lens group precedes, a first lens group is the largest of all. Therefore, to select the first lens group as the vibration reducing optical system which shifts in the direction perpendicular to the optical axis for the vibration reduction causes a holding mechanism and a driving mechanism to become large. Because of the same reason, in the zoom lens system of the present invention, it is not preferable to select the first lens group G1 as the vibration reducing group (the lens group to be shifted along the direction approximately perpendicular to the optical axis for the vibration reduction).

Also, when selecting, as the vibration reducing group, the second lens group G2 or the third lens group G3 whose the shift amount in the optical axis direction is large at the time of changing the focal length of the zoom lens system, the holding mechanism and the drive mechanism become complicated.

Then, in the present invention, taking into consideration that aberration characteristics of the front lens group G41 of the fourth lens group G4 are preferable in the vibration reducing operation, the front group G41 of the fourth lens group G4 is selected as the vibration reducing group. In this case, it is desirable to dispose an aperture stop in the vicinity of the front group G41 of the fourth lens group G4 so as to be able to perform the vibration reduction without causing the difference of image quality between the central area of the image plane and the marginal area of that.

It is desirable to make the front group G41 of the fourth lens group as the vibration reducing group and the aperture stop fixed at the time of changing the focal length of the zoom lens system for simplicity of the mechanism.

In order to achieve more favorable imaging performance, in addition to the above condition, it is preferable to satisfy the following conditions:

$$0.5 < f41/(fw \cdot fT)^{1/2} < 8, \qquad (1)$$

wherein f41: a focal length of the front group G41 of the fourth lens group G4 fW: a focal length of the whole zoom lens system in the wide-angle end fT: a focal length of the whole zoom lens system in the telephoto end.

The condition (1) defines a proper range with respect to the focal length fW of the whole zoom lens system in the wide-angle end, the focal length fT of that in the telephoto end and the focal length f41 of the front group G41 of the fourth lens group G4.

When the upper limit of the condition (1) is violated, the focal length f41 of the front group G41 of the fourth lens group G4 becomes large, so that the shift amount of the vibration reducing group in the vibration reducing operation becomes large. As a result, in order to prevent the luminous flux from being eclipsed when shifting the front group G41 of the fourth lens group G4 in the direction perpendicular to the optical axis, it is necessary to form the diameters of lenses of the front group G41 of the fourth lens group G4 excessively largely. Also, the whole length of the zoom lens system becomes long.

On the other hand, when the lower limit of the condition (1) is violated, the focal length f41 of the front group G41 of the fourth lens group G4 becomes too small. Therefore, when changing the focal length of the zoom lens system, the spherical aberration tends to become excessively large toward the negative side. When the lower limit of the condition (1) is violated, an amount of movement of an image position with respect to a shift amount of the vibration reducing lens becomes too large. As a result, when shifting the vibration reducing group in the direction perpendicular to the optical axis, it becomes difficult to control minute positioning of the corresponding image position and the speed of movement of the image position.

In order to achieve more favorable imaging performance, it is preferable to set the lower limit of the condition (1) to 1 or more and to set the upper limit thereof to 4 or less.

Also, in the present invention, in order to achieve more favorable imaging performance, it is preferable to satisfy the following condition (2):

$$0.2 < f41/f42 < 10, \qquad (2)$$

wherein f41: the focal length of the front group G41 of the fourth lens group G4 f42: a focal length of the rear group of the fourth lens group G4.

The condition (2) defines a proper range of the ratio of the focal length f41 of the front group G41 of the fourth lens group G4 to the focal length f42 of the rear group G42 thereof. This condition is important to achieve favorable imaging performance when forming the fourth lens group G4 actually.

When the upper limit of the condition (2) is violated, the spherical aberration is liable to become excessively large toward the negative side. Also, the whole length of the zoom lens system becomes long, which is then unsuitable to make the zoom lens system compact. Further, the Petzval sum is liable to become too large toward the positive side. In addition, the astigmatic difference and the field curvature become large, so favorable imaging performance cannot be achieved.

On the other hand, when the lower limit of the condition (2) is violated, it is difficult to obtain a sufficient back focus. Also, the spherical aberration is liable to become too large toward the negative side and the outward comatic aberration is liable to occur in light rays above a principal ray. In order to achieve more favorable imaging performance, it is preferable to set the lower limit of the condition (2) to 0.3 or more and to set the upper limit thereof to 4 or less.

Further, in order to achieve more favorable imaging performance in the present invention, it is desirable to satisfy the following condition (3):

$$\Delta S41/f41 < 0.1, \qquad (3)$$

wherein $\Delta S41$: a maximum shift amount of the front group G41 of the fourth lens group G4 from the optical axis in the vibration reducing operation f41: the focal length of the front group G41 of the fourth lens group G4.

The condition (3) defines a proper range of the maximum shift amount $\Delta S41$ of the front group G41 of the fourth lens group G4 from the optical axis in the vibration reducing operation by its ratio with respect to the focal length f41 of the front group G41 of the fourth lens group G4.

When the upper limit of the condition (3) is violated, the maximum shift amount of the front group G41 of the fourth lens group G4 becomes too large. As a result, changes of aberrations become large in the vibration reducing operation.

Particularly, in a marginal area on an image surface, the difference between an optimum image surface in the meridional direction and an optimum image surface in the saggital direction is increased in the optical direction. In addition, the related mechanism becomes complicated.

Also, in order to achieve more favorable imaging performance in the present invention, it is desirable to satisfy the following condition (4):

$$0.3 < R411/f41 < 4.0, \qquad (4)$$

wherein

R411: a radius of curvature of a lens surface of the front group G41 of the fourth lens group G4 located closest to the object side f41: the focal length of the front group G41 of the fourth lens group G4.

The condition (4) shows a proper range of the radius of curvature of the lens surface of the front group G41 of the fourth lens group G4 located closest to the object side by its ratio with respect to the focal length f41 of the front group G41 of the fourth lens group G4.

When the range of the condition (4) is violated, changes of the spherical aberration, the field curvature and the astigmatism become too large when changing the focal length of the zoom lens system. Also, in the vibration reducing operation, changes of the spherical aberration and the comatic aberration become too large, making it difficult to correct those aberrations.

Further, in order to achieve more preferable imaging performance in the present invention, it is desirable to satisfy the following condition (5):

$$L/f4<0.35 \qquad (5)$$

wherein L: a thickness of the front group G41 of the fourth lens group G4 along the optical axis f4: a focal length of the fourth lens group G4.

The condition (5) defines a proper range of the thickness L of the front group G41 of the fourth lens group G4 by its ratio with respect to the focal length f4 of the fourth lens group G4.

When the upper limit of the condition (5) is violated, the thickness L of the front group G41 of the fourth lens group G4 becomes large, so that the vibration reducing group becomes large and the whole length of the zoom lens system becomes long. In addition, the vibration reducing mechanism becomes complicated.

When forming the front group G41 of the fourth lens group G4 actually, it is desirable to satisfy the following conditions (6) and (7):

$$N+<1.6 \qquad (6)$$

$$45<v+, \qquad (7)$$

wherein

N+: a refractive index of a positive lens element of the front group G41 of the fourth lens group G4 located closest to the object side with respect to the d-line (λ=587.6 nm)

v+: an Abbe number of the positive lens element of the front group G41 of the fourth lens group G4 located closest to the object side with respect to the d-line (λ=587.6 nm).

When the upper limit of the condition (6) is violated, the spherical aberration in the telephoto end is liable to become too large toward the positive side and the Petzval sum is liable to shift toward the negative side. As a result, favorable imaging performance cannot be achieved.

On the other hand, when the lower limit of the condition (7) is violated, the occurrence of the axial chromatic aberration becomes too large. As a result, favorable imaging performance cannot be achieved.

In order to achieve more favorable imaging performance, in addition to the above conditions, it is preferable to satisfy the following conditions (8) and (9):

$$-1.5-q+<0.8 \qquad (8)$$

$$0<q-<35, \qquad (9)$$

wherein q+=a shape factor of one of at least one positive lens element of the front group of the fourth lens group located closest to the object side q−=a shape factor of one of at least one negative lens element of the front group of the fourth lens group located closest to the object side.

If the radius of curvature of an object-side lens surface of the lens element is R1 and the radius of curvature of an image-side surface of the lens element is R2, the shape factor q is defined by:

$$q=(R2+R1)/(R2-R1). \qquad (a)$$

When the upper limit of the condition (8) is violated, the spherical aberration becomes large in the negative direction and the inward comatic aberration becomes large.

On the other hand, when the lower limit of the condition (8) is violated, the spherical aberration becomes large in the negative direction and the astigmatic difference becomes large.

When the upper limit of the condition (9) is violated, the spherical aberration becomes large in the positive direction and the spherical aberration and the comatic aberration become large in the vibration reducing operation.

On the other hand, when the lower limit of the condition (9) is violated, the spherical aberration becomes large in the positive direction and the spherical aberration and the comatic aberration become large in the vibration reducing operation.

In order to achieve more preferable imaging performance, it is important to satisfy the following condition (10):

$$0.15<|f2|/f1<0.45 \qquad (10)$$

wherein f1: a focal length of the first lens group G1 f2: a focal length of the second lens group G2.

When the upper limit of the condition (10) is violated, the spherical aberration in the telephoto end becomes large in the negative direction and the change of the comatic aberration becomes too large.

On the other hand, when the lower limit of the condition (10) is violated, the spherical aberration in the telephoto end becomes large in the positive direction and the astigmatic difference in the wide-angle end becomes large. Also, the distortion is shifted largely toward the negative side between the wide-angle end and the telephoto end, and the Petzval sum is liable to shift toward the negative side.

In order to achieve more favorable imaging performance in the present invention, it is desirable to satisfy the following condition (11):

$$0.8<f4/f3<1.7, \qquad (11)$$

wherein f3: a focal length of the third lens group G3 f4: the focal length of the fourth lens group G4.

When the upper limit of the condition (11) is violated, the spherical aberration becomes large in the negative direction and the change of the comatic aberration becomes too large. Also, the Petzval sum is liable to shift toward the positive side.

On the other hand, when the lower limit of the condition (11) is violated, the whole length of the zoom lens system becomes long. Also, the distortion in the telephoto end is liable to become too large in the positive direction. Further, the diameter of the lens groups located on the object side of the third lens group G3 become large.

When forming the zoom lens system actually, it is preferable to make the first lens group G1 and the fourth lens group G4 fixed along the optical axis at the time of changing the focal length of the zoom lens system and to move the second lens group G2 and the third lens group G3 at that time. Also, it is desirable to make afocal a space between third Lens group G3 and the fourth lens group G4. By adopting such a structure, it is possible to form the mechanism for changing the focal length of the zoom lens system simply.

In the present invention, when forming the front group G41 of the fourth lens group with two lenses (including a cemented lens), it is desirable to form it by the use of a positive lens element and a negative meniscus lens element with a strong convex surface directed to the image side.

Further, when forming the front group G41 of the fourth lens group with three lenses (including a cemented lens), it is preferable to form it by the use of a biconvex lens element, a negative meniscus lens element and a positive lens element.

In the rear group G42 of the fourth lens group, a lens located closest to the object side should be preferably a positive meniscus lens with a convex surface directed to the object side.

Further, it is preferable to make a negative lens element of the rear group G42 of the fourth lens group located closest to the object side have the refractive index of 1.65 or more (with respect to the d-line) and the Abbe number of 40 or less (with respect to the d-line).

Furthermore, it is preferable to provide a flare stop in a stationary condition with respect to the optical axis besides the aperture stop. This reason is that the front group G41 of the fourth lens group G4 is the vibration reducing group, so when the front group G41 of the fourth lens group G4 is shifted in the direction perpendicular to the optical axis, the luminous flux in a marginal position away from the optical axis might be incident on the rear group G42 of the fourth lens group G4 as unnecessary light depending on the shift amount of the front lens group G41. Such unnecessary light causes the ghost or the unnecessary exposure. By providing the stationary flare stop, the incidence of the unnecessary light can be avoided.

BRIEF DESCRIPTION OF THE DRAWINGS

FIG. 1 shows the structure of a zoom lens system according to a first embodiment of the present invention;

FIGS. 2A to 2C show graphs of aberrations in the wide-angle end of the first embodiment in FIG. 1;

FIGS. 3A to 3C show graphs of aberrations in the telephoto end of the first embodiment in FIG. 1;

FIG. 4 shows a zoom lens system according to a second embodiment of the present invention;

FIGS. 5A to 5C show graphs of aberrations in the wide-angle end of the second embodiment in FIG. 4;

FIGS. 6A to 6C show graphs of aberrations in the telephoto end of the second embodiment in FIG. 4;

FIG. 7 shows the structure of a zoom lens system according to a third embodiment of the present invention;

FIGS. 8A to 8C show graphs of aberrations in the wide-angle end of the third embodiment in FIG. 7; and FIGS. 9A to 9C show graphs of aberrations in the telephoto end of the third embodiment in FIG. 7.

DETAILED DESCRIPTION OF THE PREFERRED EMBODIMENTS

Embodiments of the present invention will be described hereinafter with reference to the accompanying drawings. In each embodiment of the present invention, as shown in FIG. 1, a zoom lens system with a vibration reducing function has, in the following order from the object side, a first lens group G1 with a positive refractive power, a second lens group G2 with a negative refractive power, a third lens group G3 with a positive refractive power, and a fourth lens group G4 with a positive refractive power. The fourth lens group G4 has a front group G41 with a positive refractive power and a rear group G42 with a positive refractive power. In the zoom lens system of each embodiment of the present invention, when changing a focal length of the zoom lens system from a wide-angle end to a telephoto end, the distance between the first lens group G1 and the second lens group G2 is incresed, and the distance between the second lens group G2 and the third lens group G3 and the distance between the third lens group G3 and the fourth lens group G4 are changed nonlinearly.

Also, the zoom lens system of each embodiment of the present invention has, as shifting means, a vibration detecting device 10 for detecting a deviation of the zoom lens system, a drive device 20 for shifting the front group G41 of the fourth lens group G4 along the direction substantially perpendicular to the optical axis and a controller 30 for controlling the drive device 20 so as to correct the displacement of an image due to vibration based on the output from the vibration detecting device 10.

The vibration detecting device 10 detects an amount of rotation of the zoom lens system with the direction perpendicular to the optical axis as an axis. As the vibration detecting device 10, e.g., an angular velocity sensor or an angular acceleration sensor can be utilized. As the drive device 20, a motor, a coreless motor or a piezo element can be utilized. The structures of the vibration detecting device 10, the drive device 20 and the controller 30 may be those described in U.S. Ser. No. 08/129,580 (filed on Sep. 30, 1993) applied by the applicant of the present invention and then, the description thereof is omitted here by referring to U.S. Ser. No. 08/129,580.

In the zoom lens system of each embodiment of the present invention, when the second lens group G2 and the third lens group G3 are moved along the optical axis, an amount of movement of an image on an image surface is changed with respect to the shift amount of the front group G41 of the fourth lens group G4 in the direction perpendicular to the optical axis.

Therefore, in the zoom lens system of each embodiment of the present invention, an encoder 40 is provided so as to detect the position of the second lens group G2 along the optical axis when changing the focal length of the zoom lens system. The controller 30 is provided with a ROM (Read Only Memory) 35. The ROM 35 stores the relationship between the position of the second lens group G2 along the optical axis, the deviation of the zoom lens system and the shift amount of the vibration reducing lens group for correcting the deviation of the zoom lens system (the amount of correction of the vibration reducing group) as a reference table.

Therefore, when the zoom lens system is vibrated in each embodiment, the vibration detecting device 10 detects the amount of rotation (deviation) of the zoom lens system with the perpendicular direction to the optical axis as the axis, and sends it to the controller 30. Based on the output from the vibration detecting device 10 and the output from the encoder 40, the controller 30 refers to the ROM 35 (reference table) and calculates a shift amount of the front group G41 (vibration reducing group) of the fourth lens group G4 in the perpendicular direction to the optical axis. Thereafter, the controller 30 controls the drive device 20 such that the front group G41 is shifted by the above calculated shift amount in the perpendicular direction to the optical axis.

Although the position of the second lens group G2 along the optical axis is detected to calculate the shift amount of the vibration reducing group in the above, the position of the third lens group G3 along the optical axis may be detected by an encoder. Also, the encoder 40 may be formed to detect the positions of two or more lens groups along the optical axis.

As the encoder 40, e.g., a linear or rotary encoder can be utilized. When a linear encoder is utilized, it is possible to adopt a structure in which the position of the lens group to be detected along the optical axis is directly detected, i.e., a structure in which the position of a member for supporting the lens group is detected. On the other hand, when a rotary encoder is utilized, it is possible to adopt a structure in which an angle of rotation of a member rotating around the optical axis at the time of changing the focal length of the zoom lens, i.e., an angle of rotation of the lens barrel with cam grooves or the like is detected. When adopting the structure of detecting the angle of rotation of the member rotating around the optical axis at the time of changing the focal length of the zoom lens, it is preferable to store, in the reference table, the relationship between the angle of rotation of this member and the shift amount of the vibration reducing group (the amount of correction of the vibration reducing group) to be shifted to correct the deviation of the zoom lens system.

When adopting the structure of detecting the position of the lens group in the optical axis direction directly, it is preferable to detect the lens group having a zoom locus whose distance from an image point is constantly decreased or increased. Also, when detecting the angle of rotation of the member rotating around the optical axis at the time of changing the focal length of the zoom lens system, the zoom locus of the lens group may be any form.

When it is necessary to change the amount of correction of the vibration correcting group in accordance with the object distance, the position of the lens group shifted along the optical axis direction in a focusing operation is detected by e.g., an encoder or the angle of rotation of a member rotating around the optical axis in a focusing operation, i.e., the angle of rotation of a member provided with a focusing cam is detected by, e.g., an encoder. Then, the controller 30 can calculate an amount of correction of the vibration correcting group by referring to the reference table storing the relationship between the output of the encoder, the deviation of the zoom lens system and the amount of correction of the vibration correcting group.

Also, instead of storing, as the reference table, the relationship between the position of the lens group moved in the optical axis direction in the zooming operation (or the angle of rotation of the member rotating around the optical axis in the zooming operation) and the shift amount (the amount of correction) of the vibration reducing group, the following control is possible.

For example, if a focal length of the whole zoom lens system in the wide-angle end is fW, a focal length of the whole zoom lens system in the telephoto end is fT, a focal length f of the whole zoom lens system in any zoom position is expressed as:

$$f = fW \cdot Z, \ (fW \leq f \leq fT) \quad (b)$$

wherein Z is a value corresponding to a position of the lens group moved in the optical axis direction in a zooming operation. Also, if a focal length of the zoom lens system is f and an angle of a light ray being incident on the zoom lens system with respect to the optical axis is e, the height Y of an image on an image surface is expressed as:

$$Y = f \cdot \tan \theta. \quad (c)$$

From the equations (b) and (c), $$fW \cdot Z \cdot \tan \theta = Y. \quad (d)$$

Therefore, when the value corresponding to Z is detected by the encoder and the angle θ is detected by the vibration detecting device 10, the height Y of the image (the deviation Y of the image on the image surface) can be calculated. Accordingly, the controller 30 should control the deviation Y of the image so as to be substantially zero.

The structure of each embodiment will be described below.

[First Embodiment]

FIG. 1 shows the structure of the zoom lens system according to the first embodiment of the present invention.

The zoom lens system of the first embodiment is a telephotographic zoom lens to which the present invention is applied.

The zoom lens system has, in the following order from the object side, the first lens group G1 consisting of a cemented lens element formed of a negative meniscus lens element with a convex surface directed to the object side and a biconvex lens element, a positive meniscus lens element with a convex surface directed to the object side and a positive meniscus lens element with a convex surface directed to the object side; the second lens group G2 consisting of a cemented lens element formed of a positive meniscus lens element with a concave surface directed to the object side and a biconcave lens element, a negative meniscus lens element with a convex surface directed to the object side, a cemented lens element formed of a biconcave lens element and a positive meniscus lens element with a convex surface directed to the object side and a biconcave lens element; the third lens group G3 consisting of a biconvex lens element and a cemented lens element formed of a biconvex lens element and a negative meniscus lens element with a concave surface directed to the object side; and the fourth lens group G4 consisting of a biconvex lens element, a negative meniscus lens element with a concave surface directed to the object side, a positive meniscus lens element with a convex surface directed to the object side, a positive meniscus lens element with a convex surface directed to the object side, a negative meniscus lens element with a convex surface directed to the object side, a biconvex lens element and a negative meniscus lens element with a concave surface directed to the object side.

In the fourth lens group G4, two lens elements from the object side, i.e., the biconvex lens element and the negative meniscus lens element with the concave surface directed to the object side constitute a front group G41 and the lens elements on the image side beyond the front group G41 constitute a rear group G42.

An aperture stop S is provided in the rear group G42 of the fourth lens group G4.

FIG. 1 shows the positional relationship between the lens groups in the wide-angle end. When changing the focal length of the zoom lens system from the wide-angle end to the telephoto end, the respective lens groups are moved on the optical axis along zoom loci as indicated by arrows in the drawing. The first lens group G1 and the fourth lens group G4 are fixed in the optical axis direction when changing the focal length of the zoom lens system. As mentioned above, the drive device 20 controlled by the controller 30 shifts the front group G41 of the fourth lens group G4 based on the output from the vibration detecting device 10. Thereby, fluctuation of an image due to vibration of the zoom lens system is corrected.

Values of various elements of the first embodiment of the present invention is shown in the following Table 1. In the Table 1, f, $F_{NO}$, 2ω and Bf represent the focal length, F-number, angle of view and back focus respectively. Further, left end figures indicate the order of the respective lens surfaces from the object side. r represents the radius of curvature of each lens surface and d represents the distance between the adjacent lens surfaces. n and ν respectively represent the refractive index and Abbe number with respect to d-lines (λ=587.6 nm).

TABLE 1 f = 82.5–19 6
$F_{NO}$ = 2.87–2.88
2ω = 29.8°–12.14°

| | r | d | ν | n |
|---|---|---|---|---|
| 1 | 111.7728 | 3.0000 | 23.01 | 1.86074 |
| 2 | 81.9056 | 10.0000 | 82.52 | 1.49782 |
| 3 | −1122.4890 | 0.5000 | | |
| 4 | 147.0487 | 5.0000 | 82.52 | 1.49782 |
| 5 | 1289.3781 | 0.5000 | | |
| 6 | 139.6213 | 4.0000 | 82.52 | 1.49782 |
| 7 | 308.5193 | (d7 = Variable) | | |
| 8 | −2307.0854 | 3.0000 | 23.01 | 1.86074 |
| 9 | −140.1693 | 2.4000 | 43.35 | 1.84042 |
| 10 | 185.0435 | 1.2500 | | |
| 11 | 5934.3480 | 1.5000 | 54.01 | 1.61720 |
| 12 | 77.4974 | 17.0767 | | |
| 13 | −112.4835 | 1.5000 | 69.98 | 1.51860 |
| 14 | 41.0222 | 4.7000 | 25.50 | 1.80458 |
| 15 | 140.1085 | 2.9000 | | |
| 16 | −113.1904 | 1.5000 | 48.04 | 1.71700 |
| 17 | 125.8795 | (d17 = Variable) | | |
| 18 | 313.7972 | 4.8000 | 60.23 | 1.51835 |
| 19 | −80.4956 | 0.2000 | | |
| 20 | 123.7231 | 7.8000 | 60.69 | 1.56384 |
| 21 | −49.8380 | 1.6000 | 31.62 | 1.75692 |
| 22 | −228.8136 | (d22 = Variable) | | |
| 23 | 287.3354 | 4.0000 | 82.52 | 1.49782 |
| 24 | −187.8453 | 1.6000 | | |
| 25 | −78.3727 | 2.5000 | 23.82 | 1.84666 |
| 26 | −86.2338 | 1.3128 | | |
| 27 | 44.7702 | 5.9358 | 82.52 | 1.49782 |
| 28 | 104.2686 | 2.2429 | | |
| 29 | ∞ | 0.2000 | (Stop) | |
| 30 | 29.6647 | 4.5096 | 56.41 | 1.50137 |
| 31 | 49.5802 | 0.5701 | | |
| 32 | 55.4366 | 3.5138 | 33.89 | 1.80384 |
| 33 | 27.7231 | 20.4617 | | |
| 34 | 173.6793 | 7.8581 | 38.03 | 1.60342 |
| 35 | −104.7584 | 14.6083 | | |
| 36 | −35.2421 | 3.1161 | 47.47 | 1.78797 |
| 37 | −55.9019 | (B f) | | |

(Variagle Distance in Varying Focal Length)

| f | 82.5 | 196 |
|---|---|---|
| d7 | 1.89479 | 36.06282 |
| d17 | 23.91190 | 2.54250 |
| d22 | 15.92573 | 3.12710 |
| B f | 45.95100 | 45.95100 |

(Values corresponding to Conditins)

| | | |
|---|---|---|
| (1) | f41/(fW · fT)$^{1/2}$ = | 2.259 |
| (2) | f41/f42 = | 1.322 |
| (3) | ΔS41/f41 = | 0.00864 |
| (4) | R411/f41 = | 1.000 |
| (5) | L/f4 = | 0.0714 |
| (6) | N+ = | 1.49782 |
| (7) | ν+ = | 82.5 |
| (8) | q+ = | −0.209 |
| (9) | q− = | 20.939 |
| (10) | |f2|f1| = | 0.258 |
| (11) | f4/f3 = | 1.364 |

FIGS. 2A to 2C respectively show a graph of longitudinal aberrations in the wide-angle end (focal length f=82.5), a graph of transverse aberrations in the wide-angle end, and a graph of transverse aberrations in the wide-angle end at the time when the position of an image is corrected by shifting the vibration reducing group. FIGS. 3A to 3C respectively show a graph of longitudinal aberrations in the telephoto end (focal length f=196), a graph of transverse aberrations in the telephoto end, and a graph of transverse aberrations in the telephoto end at the time when the position of an image is corrected by shifting the vibration reducing group.

In the respective graphs of the aberrations, $F_{NO}$, Y, D and G represent the F-number, the height of the image, the d-line (λ=587.6 nm) and the g-line (λ=435.8 nm) respectively. Also, in the graphs showing the astigmatism, solid lines indicate saggital image surfaces while broken lines indicate meridional image surfaces. Further, FIGS. 2C and 3C are the transverse aberrations at the time when the front group of the fourth lens group G4 is shifted 2.48 mm in the perpendicular direction to the optical axis. At this time, the deviation ΔY of the image on the image surface is ΔY=0.99 mm and is constant in spite of zoom positions.

As is apparent from the graphs of the respective aberrations, the various aberrations are compensated preferably at all times including the vibration reducing operation.

[Second Embodiment]

FIG. 4 shows the structure of the zoom lens system according to the second embodiment of the present invention. The zoom lens system of the second embodiment is a telephotographic zoom lens to which the present invention is applied.

The zoom lens system has, in the following order from the object side, the first lens group G1 consisting of a cemented lens element formed of a negative meniscus lens element with a convex surface directed to the object side and a biconvex lens element and a positive meniscus lens element with a convex surface directed to the object side; the second lens group G2 consisting of a cemented lens element formed of a positive meniscus lens element with a concave surface directed to the object side and a biconcave lens element, a negative meniscus lens element with a convex surface directed to the object side, a cemented lens element formed of a biconcave lens element and a positive meniscus lens element with a convex surface directed to the object side and a biconcave lens element; the third lens group G3 consisting of a biconvex lens element and a cemented lens element formed of a biconvex lens element and a negative meniscus lens element with a concave surface directed to the object side; and the fourth lens group G4 consisting of a biconvex lens element, a negative meniscus lens element with a concave surface directed to the object side, a positive meniscus lens element with a concave surface directed to the object side, a positive meniscus lens element with a convex surface directed to the object side, a positive meniscus lens element with a convex surface directed to the object side, a negative meniscus lens element with a convex surface directed to the object side, a biconvex lens element and a negative meniscus lens element with a concave surface directed to the object side.

In the fourth lens group G4, three lens elements from the object side, i.e., the biconvex lens element, the negative meniscus lens element with the concave surface directed to the object side and the positive meniscus lens element with the concave surface directed to the object side constitute a front group G41 and the lens elements on the image side beyond the front group G41 constitute a rear group G42.

An aperture stop S is provided between the front and rear groups G41 and G42 of the fourth lens group G4.

FIG. 4 shows the positional relationship between the lens groups in the wide-angle end. When changing the focal length of the zoom lens system from the wide-angle end to the telephoto end, the respective lens groups are moved on the optical axis along zoom loci as indicated by arrows in the drawing. The first lens group G1 and the fourth lens group G4 are fixed in the optical axis direction when changing the focal length of the zoom lens system. As mentioned above, the drive device 20 controlled by the controller 30 shifts the front group G41 of the fourth lens group G4 based on the output from the vibration detecting device 10. Thereby, fluctuation of an image due to vibration of the zoom lens system is corrected.

Although the zoom lens system of the second embodiment has the same basic structure as that of the first embodiment, the refractive powers and shapes of the respective lens groups are different from those of the first embodiment.

Values of various elements of the second embodiment of the present invention is shown in the following Table 2. In the Table 2, f, $F_{NO}$, 2ω and Bf represent the focal length, F-number, angle of view and back focus respectively. Further, left end figures indicate the order of the respective lens surfaces from the object side. r represents the radius of curvature of each lens surface and d represents the distance between the adjacent lens surfaces. n and ν respectively represent the refractive index and Abbe number with respect to d-lines (λ=587.6 nm).

TABLE 2 f = 82.5–196
$F_{NO}$ = 2.90–2.95
2ω = 30.5°–12.22°

| | r | d | ν | n |
|---|---|---|---|---|
| 1 | 101.1012 | 3.0000 | 26.05 | 1.78470 |
| 2 | 70.5616 | 12.0000 | 82.52 | 1.49782 |
| 3 | −662.6071 | 0.2000 | | |
| 4 | 103.7896 | 6.5000 | 82.52 | 1.49782 |
| 5 | 861.2654 | (d5 = Variable) | | |
| 6 | −2001.3925 | 3.0000 | 23.01 | 1.86074 |
| 7 | −164.2492 | 2.4000 | 43.35 | 1.84042 |
| 8 | 200.3419 | 1.2500 | | |
| 9 | 0307.5950 | 1.5000 | 58.54 | 1.61272 |
| 10 | 74.8352 | 16.9923 | | |
| 11 | −112.4986 | 1.5000 | 69.98 | 1.51860 |
| 12 | 40.5926 | 4.7000 | 25.50 | 1.80458 |
| 13 | 153.0743 | 2.8500 | | |
| 14 | −111.9916 | 1.5000 | 48.04 | 1.71700 |
| 15 | 115.4969 | (d15 = variable) | | |
| 16 | 288.5641 | 4.8000 | 54.55 | 1.51454 |
| 17 | −80.5246 | 0.2000 | | |
| 18 | 122.3546 | 7.8000 | 60.69 | 1.56384 |
| 19 | −49.8926 | 1.6000 | 31.62 | 1.75692 |
| 20 | −239.1621 | (d20 = Variable) | | |
| 21 | 250.8372 | 4.0000 | 69.98 | 1.51860 |
| 22 | −119.5939 | 1.8000 | | |
| 23 | −64.2364 | 1.6000 | 33.89 | 1.80384 |
| 24 | −98.3446 | 0.3000 | | |
| 25 | −323.4624 | 3.0000 | 65.77 | 1.46450 |
| 26 | −98.2228 | 0.7009 | | |
| 27 | ∞ | 1.0000 | (Stop) | |
| 28 | 35.1967 | 4.0000 | 82.52 | 1.49782 |
| 29 | 49.9938 | 3.0000 | | |
| 30 | 44.8533 | 4.5000 | 53.48 | 1.54739 |
| 31 | 99.7153 | 0.7000 | | |
| 32 | 81.1334 | 3.5000 | 35.19 | 1.74950 |
| 33 | 31.5611 | 18.1246 | | |
| 34 | 167.6155 | 5.5000 | 38.18 | 1.65128 |
| 35 | −105.7711 | 15.2458 | | |
| 36 | −44.2822 | 3.0000 | 40.90 | 1.79631 |
| 37 | −71.1536 | (B f) | | |

(Variable Distance in Varying Focal Length)

| f | 82.5 | 196 |
|---|---|---|
| d5 | 2.64714 | 37.16364 |

TABLE 2-continued

| d15 | 24.16392 | 2.26960 |
| d20 | 15.57935 | 2.95717 |
| B f | 51.29350 | 51.29350 |

(Values corresponding to Conditions)

| (1) | $f41/(fW \cdot fT)^{1/2} =$ | 1.456 |
| (2) | f41/f42 = | −0.536 |
| (3) | ΔS41/f41 = | 0.00636 |
| (4) | R411/f41 = | 1.3550 |
| (5) | L/f4 = | 0.0957 |
| (6) | N+ = | 1.51860 |
| (7) | ν+ = | 70.0 |
| (8) | q+ = | −0.354 |
| (9) | q− = | 4.767 |
| (10) | |f2|/f1 = | 0.258 |
| (11) | f4/f3 = | 1.345 |

FIGS. 5A to 5C respectively show a graph of longitudinal aberrations in the wide-angle end (focal length f=82.5), a graph of transverse aberrations in the wide-angle end, and a graph of transverse aberrations in the wide-angle end at the time when the position of an image is corrected by shifting the vibration reducing group. FIGS. 6A to 6C respectively show a graph of longitudinal aberrations in the telephoto end (focal length f=196), a graph of transverse aberrations in the telephoto end, and a graph of transverse aberrations in the telephoto end at the time when the position of an image is corrected by shifting the vibration reducing group.

In the respective graphs of the aberrations, $F_{NO}$, Y, D and G represent the F-number, the height of the image, the d-line (λ=587.6 nm) and the g-line (λ=435.8 nm) respectively. Also, in the graphs showing the astigmatism, solid lines indicate saggital image surfaces while broken lines indicate meridional image surfaces. Further, FIGS. 5C and 6C are the transverse aberrations at the time when the front group of the fourth lens group G4 is shifted 1.18 mm in the perpendicular direction to the optical axis. At this time, the deviation ΔY of the image on the image surface is ΔY=0.73 mm and is constant in spite of zoom positions.

As is apparent from the graphs of the respective aberrations, the various aberrations are compensated preferably at all times including the vibration reducing operation.

[Third Embodiment]

FIG. 7 shows the structure of the zoom lens system according to the third embodiment of the present invention.

The zoom lens system has, in the following order from the object side, the first lens group G1 consisting of a biconvex lens element, a cemented lens element formed of a negative meniscus lens element with a convex surface directed to the object side and a positive meniscus lens element with a convex surface directed to the object side and a negative meniscus lens element with a convex surface directed to the object side; the second lens group G2 consisting of a cemented lens element formed of a positive meniscus lens element with a concave surface directed to the object side and a biconcave lens element and a cemented lens element formed of a biconcave lens element and a positive meniscus lens element with a convex surface directed to the object side; the third lens group G3 consisting of a cemented lens element formed of a biconvex lens element and a negative meniscus lens element with a concave surface directed to the object side; and the fourth lens group G4 consisting of a biconvex lens element, a negative meniscus lens element with a concave surface directed to the object side, a biconvex lens element, a negative meniscus lens element with a concave surface directed to the object side, a biconvex lens element and a negative meniscus lens element with a concave surface directed to the object side.

In the fourth lens group G4, two lens elements from the object side, i.e., the biconvex lens element and the negative meniscus lens element with the concave surface directed to the object side constitute a front group G41 and the lens elements on the image side beyond the front group G41 constitute a rear group G42.

An aperture stop S is provided between the front and rear groups G41 and G42 of the fourth lens group G4. Also, a stationary flare stop FS is provided in the rear group G42 of the fourth lens group G4.

FIG. 7 shows the positional relationship between the lens groups in the wide-angle end. When changing the focal length of the zoom lens system from the wide-angle end to the telephoto end, the respective lens groups are moved on the optical axis along zoom loci as indicated by arrows in the drawing. The first lens group G1 and the fourth lens group G4 are fixed in the optical axis direction when changing the focal length of the zoom lens system. As mentioned above, the drive device 20 controlled by the controller 30 shifts the front group G41 of the fourth lens group G4 based on the output from the vibration detecting device 10. Thereby, fluctuation of an image due to vibration of the zoom lens system is corrected.

The zoom lens system of the third embodiment is a telephotographic zoom lens to which the present invention is applied and has the same basic structure as that of the first embodiment, but the refractive powers and shapes of the respective lens groups are different from those of the first embodiment.

Values of various elements of the third embodiment of the present invention is shown in the following Table 3. In the Table 3, f, $F_{NO}$, 2ω and Bf represent the focal length, F-number, angle of view and back focus respectively. Further, left end figures indicate the order of the respective lens surfaces from the object side. r represents the radius of curvature of each lens surface and d represents the distance between the adjacent lens surfaces. n and ν respectively represent the refractive index and Abbe number with respect to d-lines (λ=587.6 nm).

TABLE 3 f = 100–300
$F_{NO}$ = 4.54–4.56
2ω = 24.66°–8.04°

| | r | d | ν | n |
|---|---|---|---|---|
| 1 | 108.2000 | 8.8000 | 82.52 | 1.49782 |
| 2 | −4776.2252 | 15.8929 | | |
| 3 | 4.9000 | 3.2000 | 40.90 | 1.79631 |
| 4 | 5.8000 | 12.4000 | 82.52 | 1.49782 |
| 5 | 32.6743 | 2.5971 | | |
| 6 | 300.0000 | 3.3000 | 35.19 | 1.74950 |
| 7 | 80.6838 | (d7 = variable) | | |
| 8 | −515.0000 | 3.5000 | 28.19 | 1.74000 |
| 9 | −73.8500 | 2.0000 | 49.45 | 1.77279 |
| 10 | 59.0000 | 6.0000 | | |
| 11 | −63.0000 | 2.0000 | 53.93 | 1.71300 |
| 12 | 58.6000 | 3.5000 | 25.50 | 1.80458 |
| 13 | −3068.9296 | (d13 = variable) | | |
| 14 | 31.5000 | 6.0000 | 48.97 | 1.53172 |
| 15 | −36.4000 | 2.0000 | 25.50 | 1.80458 |
| 16 | −64.5181 | (d16 = variable) | | |
| 17 | 60.0000 | 2.0000 | 82.52 | 1.49782 |
| 18 | −370.0000 | 1.0000 | | |
| 19 | −150.0000 | 1.8000 | 44.69 | 1.80218 |
| 20 | −170.0000 | 1.0000 | | |
| 21 | ∞ | 1.0000 | (stop) | |
| 22 | 44.0000 | 5.5000 | 82.52 | 1.49782 |
| 23 | −111.9029 | 6.2000 | | |
| 24 | −100.0000 | 3.0000 | 35.19 | 1.74950 |
| 25 | 281.5459 | 22.0000 | | |

TABLE 3-continued

| 26 | ∞ | 20.0000 | (stop) | |
|---|---|---|---|---|
| 27 | 195.0000 | 3.5000 | 28.19 | 1.74000 |
| 28 | −149.3517 | 3.0000 | | |
| 29 | −35.1500 | 3.0000 | 60.03 | 1.64000 |
| 30 | −116.1441 | (B f) | | |

(Variable Distance in Varying Focal Length)

| f | 100 | 300 |
|---|---|---|
| d7 | 2.00942 | 55.15741 |
| d13 | 41.19679 | 2.27801 |
| d16 | 23.22152 | 8.99231 |
| B f | 53.66520 | 53.66520 |

(Values corresponding to Conditions)

| (1) | f41/(fW · fT)$^{1/2}$ = | 3.563 |
|---|---|---|
| (2) | f41/f42 = | 3.223 |
| (3) | ΔS41/f41 = | 0.00810 |
| (4) | R411/f41 = | 0.9074 |
| (5) | L/f4 = | 0.0353 |
| (6) | N+ = | 1.49782 |
| (7) | ν+ = | 82.5 |
| (8) | q+ = | −0.204 |
| (9) | q− = | 16.0 |
| (10) | |f2|/f1 = | 0.312 |
| (11) | f4/f3 = | 1.220 |

FIGS. 8A to 8C respectively show a graph of longitudinal aberrations in the wide-angle end (focal length f=100), a graph of transverse aberrations in the wide-angle end, and a graph of transverse aberrations in the wide-angle end at the time when the position of an image is corrected by shifting the vibration reducing group. FIGS. 9A to 9C respectively show a graph of longitudinal aberrations in the telephoto end (focal length f=300), a graph of transverse aberrations in the telephoto end, and a graph of transverse aberrations in the telephoto end at the time when the position of an image is corrected by shifting the vibration reducing group.

In the respective graphs of the aberrations, $F_{NO}$, Y, D and G represent the F-number, the height of the image, the d-line (λ=587.6 nm) and the g-line (λ=435.8 nm) respectively. Also, in the graphs showing the astigmatism, solid lines indicate saggital image surfaces while broken lines indicate meridional image surfaces. Further, FIGS. 8C and 9C are the transverse aberrations at the time when the front group of the fourth lens group G4 is shifted 5 mm in the perpendicular direction to the optical axis. At this time, the deviation ΔY of the image on the image surface is ΔY=1.108 mm and is constant in spite of zoom positions.

As is apparent from the graphs of the respective aberrations, the various aberrations are compensated preferably at all times including the vibration reducing operation.

The following Table 4 shows the relationship between the maximum shift amount ΔS41 of the vibration reducing group and the amount ΔY41 of movement of an image on an image surface in each embodiment.

TABLE 4

| | ΔS41 | ΔY41 |
|---|---|---|
| First Embodiment | 2.48 | +0.99 |
| Second Embodiment | 1.18 | +0.73 |
| Third Embodiment | 5.0 | +1.11 |

The relationship between ΔS41 and ΔY41 is always constant whatever value the focal length of the zoom lens system is. Also, if a focal length of the zoom lens system in any zoom position is f and an amount of correction of the angle of the zoom lens system with respect to the optical axis of the zoom lens system is θ, as the amount ΔY41 of movement of an image is ΔY41 =f·tan θ, the amount θ of correction of the angle can be calculated.

According to above each embodiment, it is possible to provide a high performance zoom lens with a vibration reducing function which is applicable to a single-lens reflex camera, has a simple mechanism and is able to correspond to the brightness of the F-number of 2.8 or more.

What is claimed is:

1. A zoom lens system with a vibration reducing function comprising in the following order from the object side:

a first lens group with a positive refractive power;

a second lens group with a negative refractive power;

a third lens group with a positive refractive power; and a fourth lens group with a positive refractive power, said fourth lens group having a front group with a positive refractive power and a rear group with a positive refractive power;

wherein when changing a focal length of said zoom lens system from a wide-angle end to a telephoto end, the distance between said first lens group and said second lens group is increased, the distance between said second lens group and said third lens group and the distance between said third lens group and said fourth lens group are changed nonlinearly, and said front group of said fourth lens group is shiftable in a direction traversing an optical axis of said zoom lens system; and said zoom lens system further comprising:

drive means for shifting said front group in the direction traversing said optical axis;

detecting means for detecting vibration of said zoom lens system; and control means for controlling said drive means based on an output from said detecting means.

2. A zoom lens system according to claim 1, wherein said fourth lens group is fixed in a direction of said optical axis when changing the focal length of said zoom lens system from the wide-angle end to the telephoto end.

3. A zoom lens system according to claim 1, wherein if a focal length of said front group of said fourth lens group is f41, the focal length of said zoom lens system in the wide-angle end is fW, and the focal length of said zoom lens system in the telephoto end is fT, the following condition is satisfied:

$0.5 < F41/(fW \cdot fT)^{1/2} < 8.$

4. A zoom lens system according to claim 1, wherein if a focal length of said front group of said fourth lens group is f41 and a focal length of said rear group of said fourth lens group is f42, the following condition is satisfied:

$0.2 < f41/f42 < 10.$

5. A zoom lens system according to claim 1, wherein if a focal length of said front group of said fourth lens group is f41 and a maximum shift amount of said front group of said fourth lens group in a direction perpendicular to said optical axis is ΔS41, the following condition is satisfied:

$\Delta S41/f41 < 0.1.$

6. A zoom lens system according to claim 1, wherein if a focal length of said front group of said fourth lens group is f41 and a radius of curvature of a lens surface of said front group of said fourth lens group located closest to the object side is R411, the following condition is satisfied:

$0.3 < R411/f41 < 4.0.$

7. A zoom lens system according to claim 1, wherein if a thickness of said front group of said fourth lens group along said optical axis is L and a focal length of said fourth lens group is f4, the following condition is satisfied:

$L/f4 < 0.35.$

8. A zoom lens system according to claim 1, wherein if a refractive index of a positive lens element of said front group of said fourth lens group located closest to the object side is N+ and an Abbe number of said positive lens element is ν+, the following condition is satisfied:

$N+ < 1.6,$ $45 < \nu+.$

9. A zoom lens system according to claim 1, wherein if a shape factor of one of at least one positive lens element of said front group of said fourth lens group located closest to the object side is q+ and a shape factor of one of at least one negative lens element of said front group of said fourth lens group located closest to the object side is q−, the following condition is satisfied:

$-1.5 < q+ < 0.8$ $0 < q− < 35,$ wherein if a radius of curvature of an object-side lens surface of the lens element is R1 and a radius of curvature of an image-side surface of the lens element is R2, the shape factor q is defined by:

$q = (R2+R1)/(R2-R1).$

10. A zoom lens system according to claim 1, wherein if a focal length of said first lens group is f1 and a focal length of said second lens group is f2, the following condition is satisfied:

$0.15 < |f2|/f1 < 0.45.$

11. A zoom lens system according to claim 1, wherein if a focal length of said third lens group is f3 and a focal length of said fourth lens group is f4, the following condition is satisfied:

$0.8 < f4/f3 < 1.7.$

12. A zoom lens system according to claim 1, wherein when changing the focal length of said zoom lens system from the wide-angle end to the telephoto end, said first and fourth lens groups are fixed in a direction of said optical axis.

13. A zoom lens system according to claim 1, wherein a space between said third lens group and said fourth lens group is afocal.

14. A zoom lens system according to claim 1, wherein said front group of said fourth lens group has a positive lens element and a negative meniscus lens element with a strong convex surface directed to the image side.

15. A zoom lens system according to claim 1, wherein said front group of said fourth lens group has a biconvex lens element, a negative meniscus lens element and a positive lens element.

16. A zoom lens system according to claim 1, wherein said rear group of said fourth lens group has a positive meniscus lens element with a convex surface directed to the object side which is disposed closest to the object side in said rear group.

17. A zoom lens system according to claim 1, wherein said rear group of said fourth lens group has a negative lens element disposed closest to the object side among at least one negative lens element in said rear group, the material of said negative lens element has a refractive index of 1.65 or more and an Abbe number of 40 or less.

18. A zoom lens system according to claim 1, further comprising a flare stop fixed on said optical axis.

19. A zoom lens system according to claim 18, wherein said flare stop is disposed in a light path on the image side of said front group of said fourth lens group.

20. A zoom lens system with a vibration reducing function comprising in the following order from the object side;

a first lens group with a positive refractive power;

a second lens group with a negative refractive power;

a third lens group with a positive refractive power; and a fourth lens group with a positive refractive power, said fourth lens group having a front group with a positive refractive power and a rear group with a positive refractive power, wherein when changing a focal length of said zoom lens system from a wide-angle end to a telephoto end, the distance between said first lens group and said second lens group is increased, the distance between said second lens group and said third lens group and the distance between said third lens group and said fourth lens group are changed nonlinearly, and said front group of said fourth lens group is shiftable in a direction traversing an optical axis of said zoom lens system.

* * * * *

UNITED STATES PATENT AND TRADEMARK OFFICE
CERTIFICATE OF CORRECTION

PATENT NO. : 5,477,297
DATED : December 19, 1995
INVENTOR(S) : Kenzaburo SUZUKI

It is certified that error appears in the above-indentified patent and that said Letters Patent is hereby corrected as shown below:

In Column 13:

line 40, "0307.5950" should read --10307.5950--;

In Column 14:

line 9, "-0.536" should read --0.536--;

In Column 15:

line 48, "4.9000" should read --84.9000--;
line 49, "5.8000" should read --55.8000--;
line 50, "32.6743" should read --832.6743--;
line 51, "300.0000" should read --3300.0000--;
line 52, "80.6838" should read --280.6838--;
line 58, "31.5000" should read --131.5000--;

and line 60, "60.0000" should read --560.0000--.

Signed and Sealed this

Twenty-ninth Day of July, 1997

Attest:

BRUCE LEHMAN

*Attesting Officer*    *Commissioner of Patents and Trademarks*